United States Patent
Sun et al.

(10) Patent No.: US 11,483,382 B2
(45) Date of Patent: Oct. 25, 2022

(54) METHOD, APPARATUS AND SYSTEM FOR TRANSMITTING DATA

(71) Applicant: Beijing Baidu Netcom Science and Technology Co., Ltd., Beijing (CN)

(72) Inventors: Changqing Sun, Beijing (CN); Guang Yang, Beijing (CN); Lin Jiang, Beijing (CN); Yannan Hu, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 225 days.

(21) Appl. No.: 16/946,070

(22) Filed: Jun. 4, 2020

(65) Prior Publication Data
US 2021/0120076 A1  Apr. 22, 2021

(30) Foreign Application Priority Data
Oct. 21, 2019  (CN) .......................... 201910999167.6

(51) Int. Cl.
*G06F 15/16* (2006.01)
*H04L 67/1001* (2022.01)
(Continued)

(52) U.S. Cl.
CPC ...... *H04L 67/1001* (2022.05); *H04L 12/4641* (2013.01); *H04L 61/103* (2013.01); *H04L 2101/622* (2022.05)

(58) Field of Classification Search
CPC ............. H04L 67/1002; H04L 12/4641; H04L 61/103; H04L 61/6022
(Continued)

(56) References Cited

U.S. PATENT DOCUMENTS

2006/0253824 A1* 11/2006 Iizuka ................. G06F 11/0751
  714/E11.207
2007/0201490 A1*  8/2007 Mahamuni ............. H04L 45/24
  370/395.54
(Continued)

FOREIGN PATENT DOCUMENTS

CN  102638583 A  8/2012
CN  103023942 A  4/2013
(Continued)

OTHER PUBLICATIONS

Chinese Office Action dated Nov. 3, 2021 issued in CN Application No. 201910999167.6.

*Primary Examiner* — Duyen M Doan
(74) *Attorney, Agent, or Firm* — Weaver Austin Villeneuve & Sampson LLP (57) ABSTRACT

A method, apparatus and system for transmitting data. The system includes: the load balance gate wall translating a virtual MAC address of the virtual server in a destination address of a data packet from a client to a real MAC address of the real server according to a pre-configured address mapping relationship between a real server and a virtual server; the load balance gate wall sending a modified data packet to the virtual switch; the virtual switch determining a data packet flowing into the real server after receiving the data packet from the load balance gate wall, then translating a virtual IP and a virtual port of the virtual server in the destination address in the determined data packet to a real IP and a real port of the real server; and the virtual switch sending the modified data packet to the real server.

11 Claims, 4 Drawing Sheets

(51) Int. Cl.
*H04L 12/46* (2006.01)
*H04L 61/103* (2022.01)
*H04L 101/622* (2022.01)

(58) Field of Classification Search
USPC .......................................................... 709/203
See application file for complete search history.

(56) References Cited

U.S. PATENT DOCUMENTS

| | | | | |
|---|---|---|---|---|
| 2011/0299537 | A1* | 12/2011 | Saraiya | H04L 61/6022 |
| | | | | 370/392 |
| 2013/0227338 | A1* | 8/2013 | Lingafelt | H04L 41/12 |
| | | | | 714/E11.012 |
| 2014/0108661 | A1* | 4/2014 | Tang | H04L 67/1038 |
| | | | | 709/226 |
| 2015/0085868 | A1* | 3/2015 | Snyder, II | G06F 9/45558 |
| | | | | 370/401 |

FOREIGN PATENT DOCUMENTS

| | | | |
|---|---|---|---|
| CN | 105577723 | A | 5/2016 |
| CN | 106686085 | A | 5/2017 |
| CN | 106713499 | A | 5/2017 |
| CN | 106790675 | A | 5/2017 |
| CN | 108616456 | A | 10/2018 |
| CN | 108768817 | A | 11/2018 |

* cited by examiner

METHOD, APPARATUS AND SYSTEM FOR TRANSMITTING DATA

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and specifically to a method, apparatus and system for transmitting data.

BACKGROUND

In the implementation of public cloud load balance products, in order to make source address information visible to users, in data plane, it relies on tunnel through module (TTM). Through this module, network address translation of a data packet carrying the source address information is completed. However, this module brings a great obstacle to the stability of the public cloud and the network offload evolution of compute node topologies.

Due to the operation principle of BGW (load balance gate wall), a request from a client involves address translation in communication. BGW encapsulates these address port information into a TCP/IP option, and thus the TTM module is obtained. With the TTM module, this module may store and translate IP and port information carried by Option in the BGW message according to the corresponding mode, and maintain the normal communication of an entire session.

Although the above technical solution solves some problems of the data plane in the use of the load balance products, there are also many stability risks in use, and as part of the integration into a kernel state, it hinders the evolution of topology.

First, with the increase in demand for high-performance virtual machines, the evolutionary path of an overall computing node network topology may gradually remove a bridge and use OVS (OpenvSwitch). The TTM module requires that traffic must pass through the kernel state, which hinders the evolution process of an overall physical topology and conflicts with the overall scheme of kernel bypass.

Secondly, TTM relies on operating based on a custom TCP/IP option, which is easy to be used by external attacks and introducing security risks; at the same time, TTM may also affect a maximum transmission unit of the virtual network.

Finally, TTM may destroy the integrity of the existing kernel, which may not only reduce the performance of the kernel, but also cause an exception of the entire computing node in the event of a failure, which is extremely harmful.

SUMMARY

Embodiments of the present disclosure provide a method and apparatus for transmitting data.

In a first aspect, an embodiment of the present disclosure provides a method for transmitting data, applied to a load balance gate wall, the method including: receiving a data packet from a client, where a destination address of the data packet is a virtual MAC address of a virtual server: a virtual IP address: a virtual port; translating the virtual MAC address to a real MAC address of a real server according to an address mapping relationship between a pre-configured real server and the virtual server; and sending a modified data packet to a computing node where the real server is located, and then handing the modified data packet over to a virtual switch for processing.

In some embodiments, the method further includes: configuring, in response to an address configuration request sent by a meta-server, the address mapping relationship between the real server and the virtual server.

In a second aspect, an embodiment of the present disclosure provides a method for transmitting data, applied to a virtual switch, the method including: receiving a data packet from a load balance gate wall; determining a data packet flowing into a real server according to a flow table; translating a virtual IP and a virtual port of a virtual server in a destination address in the determined data packet to a real IP and a real port of the real server; and sending a modified data packet to the real server.

In some embodiments, after translating the virtual IP and the virtual port of the virtual server in the destination address in the determined data packet to the real IP and the real port of the real server, the method further includes: calculating an address translation relationship of the data packet returned by the real server.

In some embodiments, the method further includes: receiving the data packet returned by the real server; translating the real IP and the real port of the real server in a source address in the returned data packet to the virtual IP and the virtual port of the virtual server according to the address translation relationship; and sending the data packet returned by the real server directly to a client without the load balance gate wall.

In a third aspect, an embodiment of the present disclosure provides an apparatus for transmitting data, applied to a load balance gate wall, the apparatus including: a receiving unit, configured to receive a data packet from a client, where a destination address of the data packet is a virtual MAC address of a virtual server: a virtual IP address: a virtual port; a MAC translation unit, configured to translate the virtual MAC address to a real MAC address of a real server according to an address mapping relationship between a pre-configured real server and the virtual server; and a sending unit, configured to send a modified data packet to a computing node where the real server is located, and then hand the modified data packet over to a virtual switch for processing.

In some embodiments, the apparatus further includes a mapping unit, configured to: configure, in response to an address configuration request sent by a meta-server, the address mapping relationship between the real server and the virtual server.

In a fourth aspect, an embodiment of the present disclosure provides an apparatus for transmitting data, applied to a virtual switch, the apparatus including: a first receiving unit, configured to receive a data packet from a load balance gate wall; a determination unit, configured to determine a data packet flowing into a real server according to a flow table; a first IP translation unit, configured to translate a virtual IP and a virtual port of a virtual server in a destination address in the determined data packet to a real IP and a real port of the real server; and a first sending unit, configured to send a modified data packet to the real server.

In some embodiments, the apparatus further includes a calculation unit, configured to: calculate an address translation relationship of the data packet returned by the real server, after translating the virtual IP and the virtual port of the virtual server in the destination address in the determined data packet to the real IP and the real port of the real server.

In some embodiments, the apparatus further includes: a second receiving unit, configured to receive the data packet returned by the real server; a second IP translation unit, configured to translate the real IP and the real port of the real server in a source address in the returned data packet to the virtual IP and the virtual port of the virtual server according to the address translation relationship; and a second sending unit, configured to send the data packet returned by the real server directly to a client without the load balance gate wall.

In a fifth aspect, an embodiment of the present disclosure provides a system for transmitting data, comprising a load balance gate wall and a virtual switch, where: the load balance gate wall translates a virtual MAC address of the virtual server in a destination address of a data packet from a client to a real MAC address of the real server according to a pre-configured address mapping relationship between a real server and a virtual server; the load balance gate wall sends a modified data packet to a computing node where the real server is located, and then hands the modified data packet over to the virtual switch for processing; the virtual switch determines a data packet flowing into the real server after receiving the data packet from the load balance gate wall, then translates a virtual IP and a virtual port of the virtual server in the destination address in the determined data packet to a real IP and a real port of the real server; and the virtual switch sends the modified data packet to the real server.

In some embodiments, the the system further includes a meta-server, configured to: configure, in response to receiving a user request for configuring the real server, an address mapping relationship between the real server and the virtual server in the load balance gate wall.

In some embodiments, the system further includes a Neutron, configured to: configure a MAC forwarding rule for address translation to the virtual switch.

In a sixth aspect, an embodiment of the present disclosure provides an electronic device for transmitting data, including: one or more processors; and a storage apparatus, storing one or more programs thereon, the one or more programs, when executed by the one or more processors, cause the one or more processors to implement the method according to any embodiment in the first aspect.

In a seventh aspect, an embodiment of the present disclosure provides a computer readable medium, storing a computer program thereon, the program, when executed by a processor, implements the method according to any embodiment in the first aspect.

The method and apparatus for transmitting data provided by the embodiments of the present disclosure, by the load balance gate wall and the virtual switch performing address translation jointly, may achieve the following beneficial effects.

1. facilitating landing of the evolution of the public cloud computing topology to OVS DPDK (Data Plane Development Kit), removing a network bridge, and shortening the forwarding path of the computing node;

2. IMF (Inner MAC Forward, forwarding based on MAC) solving the problem of network-enhanced product going online, making the network-enhanced product go online as scheduled and has been applied.

3. removing TTM, completely avoiding hidden danger of stability brought by TTM.

4. IMF going online, greatly reducing delay at the business level.

5. widely used in network-enhanced virtual machines, smart cards, elastic bare metals and other products.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
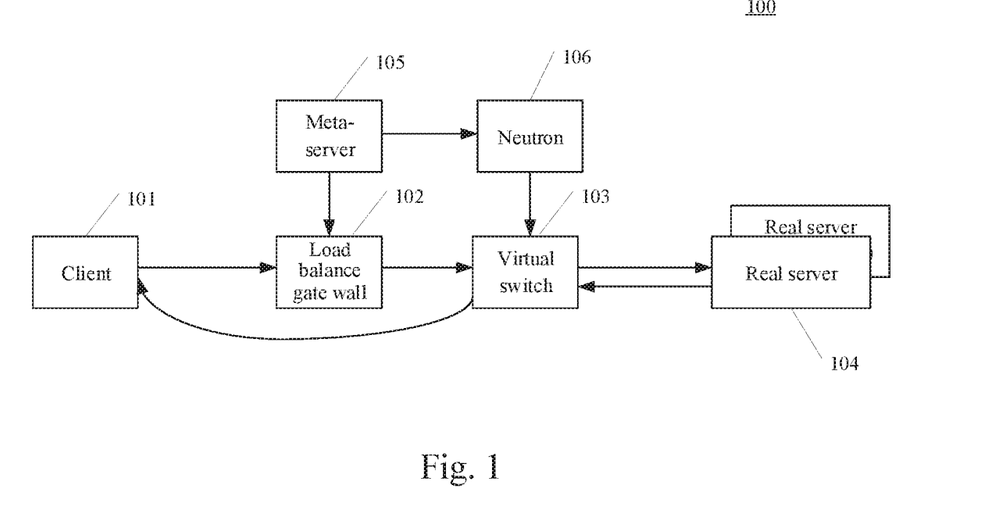
FIG. 1 is a diagram of an exemplary system architecture in which an embodiment of the present disclosure may be implemented.

FIG. 1 illustrates an exemplary system architecture 100 in which a method for transmitting data or an apparatus for transmitting data of some embodiments of the present disclosure may be implemented.

As shown in FIG. 1, the system architecture 100 may include a client 101, a load balance gate wall 102, a virtual switch 103, a real server 104, a meta-server 105, and a Neutron (meta-network). The Neutron is used to provide a communication link medium between the client, the load balance device, and the real server. The network may include various types of connections, such as wired, wireless communication links, or optic fibers.

A user may use the client 101 to interact with the real server 104 through the network to receive or send messages, or the like. Various communication client applications may be installed on the client 101, such as web browser applications, shopping applications, search applications, instant messaging tools, E-mail clients, or social platform software.

The client 101 may be hardware or software. When the client 101 is hardware, the client 101 may be various electronic devices supporting cloud computing services, including but not limited to smart phones, tablets, e-book readers, MP3 (Moving Picture Experts Group Audio Layer III) players, MP4 (Moving Picture Experts Group Audio Layer IV) players, laptop portable computers and desktop computers, and the like. When the client 101 is software, the client 101 may be installed in the electronic devices listed above. It may be implemented as a plurality of software or software modules (for example, for providing distributed services), or as a single software or software module, which is not specifically limited herein.

The Neutron provides an IMF (inner MAC forwarding) resource. This resource may perform address translation on the traffic of the load balance device according to a required rule for any RS (real server) bound to the load balance device in a VPC (virtual private cloud).

After the user configures a PORT as RS, the meta-server may deliver the configuration to the BGW and call the Neutron API to create the IMF resource.

BGW uses a new packet format for an IMF data flow. The destination MAC is the MAC of a virtual machine network card in the real server, referred to as rmac, the destination IP is the virtual IP of the virtual server in BGW, referred to as vip, and the destination port is the virtual port, referred to as vport.

After the above configuration is completed, a data packet that accesses an RS through the load balance device may be sent to the computing node in a new packet format. The IMF rule of OVS on the computing node may match this type of packet, then execute DNAT (Destination Network Address Translation), to translate to the IP of the virtual machine running on the real server, referred to as rip: rport.

The real server 104 may be a server that provides various services, such as a backend computing server that provides cloud computing services to the client 101. The backend computing server may perform analysis and other processing on a received calculation request and other data, and feed back a processing result (such as a calculation result) to the client. The data packet returned by the real server is subjected to SNAT (Source Network Address Translation) through OVS, to translate rip: rport to virtual vip: vport, and then the translated virtual vip: vport is forwarded directly to the client.

It should be noted that the method for transmitting data provided by embodiments of the present disclosure may be jointly performed by the load balance gate wall 102 and the virtual switch 103. Correspondingly, the apparatus for transmitting data may be provided in the load balance gate wall 102 and the virtual switch 103, which is not specifically limited herein.

It should be understood that the number of clients, load balance gate walls, virtual switches and real servers in FIG. 1 is merely illustrative. Depending on the implementation needs, there may be any number of clients, load balance gate walls, virtual switches and real servers.

Figure 2:
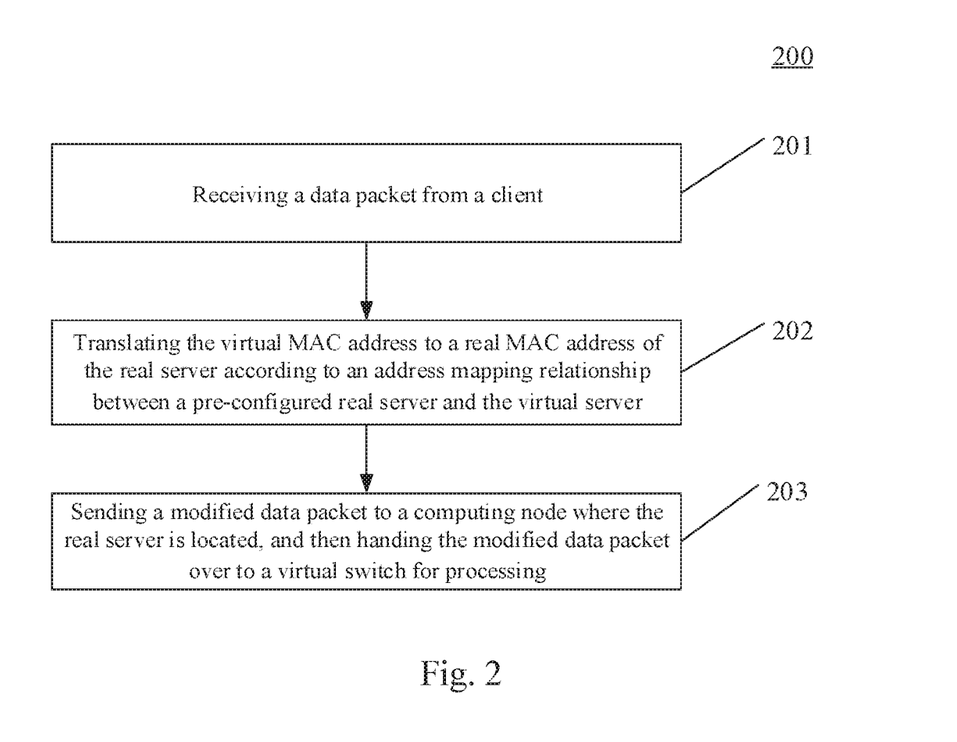
FIG. 2 is a flowchart of a method for transmitting data according to an embodiment of the present disclosure.

With further reference to FIG. 2, a flow 200 of a method for transmitting data applied to a load balance gate wall according to an embodiment of the present disclosure is illustrated. The method for transmitting data includes the following steps.

Step 201, receiving a data packet from a client.

In the present embodiment, an executing body of the method for transmitting data (for example, the load balance gate wall shown in FIG. 1) may receive the data packet from the client. The destination address of the data packet is the address of a virtual server (referred to as VS) running on BGW, for example, vmac: vip: vport. The source address is the client's network address cmac: cip: cport.

Step 202, translating the virtual MAC address to a real MAC address of the real server according to an address mapping relationship between a pre-configured real server and the virtual server.

In the present embodiment, BGW is configured with an address mapping relationship table between the real server and the virtual server in advance, therefore, BGW may translate the virtual MAC address of the virtual server to the real MAC address of the real server. That is, translating vmac to rmac but vip and vport remain unchanged.

Step 203, sending a modified data packet to a computing node where the real server is located, and then handing the modified data packet over to a virtual switch for processing.

In the present embodiment, the load balance gate wall re-encapsulates the modified data packet into a TCP packet and forwards it to the computing node where the real server is located according to the rmac address, and then hands the modified data packet over to the virtual switch for processing. Each computing node has a virtual switch. Many virtual machines are connected to the virtual switches, and the virtual machine here may be configured as RS. In addition to OVS, virtual switches may also be VSS (vSphere Standard vSwitch) and VDS (vSphere Distributed vSwitch), Cisco's Nexus 1000V, Microsoft's Hyper-V virtual switch, etc.

Figure 3:
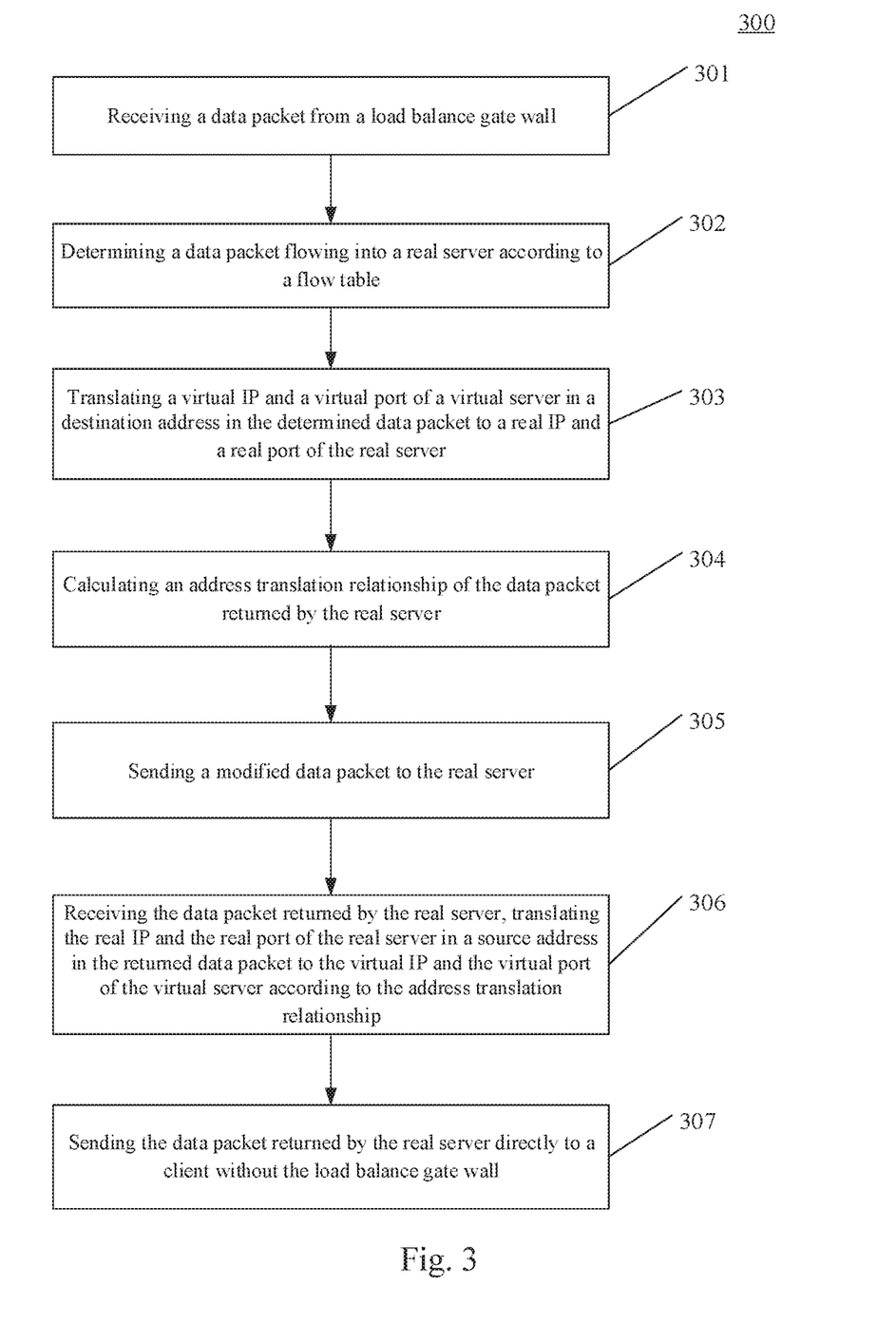
FIG. 3 is a flowchart of the method for transmitting data according to another embodiment of the present disclosure.

With further reference to FIG. 3, a flow 300 of the method for transmitting data applied to a virtual switch according to another embodiment of the present disclosure is illustrated. The flow 300 of the method for transmitting data includes the following steps.

Step 301, receiving a data packet from a load balance gate wall.

In the present embodiment, an executing body (for example, applied to the virtual switch shown in FIG. 1) of the method for transmitting data may receive the data packet from the load balance gate wall. The destination address of the data packet is rmac: vip: vport modified by BGW.

Step 302, determining a data packet flowing into a real server according to a flow table.

In the present embodiment, in OVS, the flow table is matched by vip: vport and the MAC address of a virtual machine network card to uniquely determine the data packet flowing into the virtual machine of the real server.

Step 303, translating a virtual IP and a virtual port of a virtual server in a destination address in the determined data packet to a real IP and a real port of the real server.

In the present embodiment, address translation is performed on this data packet to translate vip: vport to rip: rport.

Alternatively, the virtual switch also calculates the address translation relationship of the data packet returned by the real server while translating. In order to receive the data packet returned by RS without recalculating the address, thus the address translation may be performed quickly.

Step 304, calculating an address translation relationship of the data packet returned by the real server by the virtual switch.

In the present embodiment, the virtual switch is required to translate the source address of the data packet returned by the real server, and the source address of the returned packet may be calculated together when the packet is sent, which may save calculation time when the packet is returned. The destination address before translation of the sent packet by the virtual switch is the source address to which the returned packet needs to be translated.

Step 305, sending a modified data packet to the real server.

In the present embodiment, the virtual switch re-encapsulates the modified data packet into a TCP packet and sends the TCP packet to RS according to the real IP and the real port.

Step 306, in response to receiving the modified data packet returned by the real server, translating the real IP and the real port of the real server in a source address in the returned data packet to the virtual IP and the virtual port of the virtual server according to the address translation relationship.

In the present embodiment, according to the address translation relationship obtained in step 304, the source address matching of the packet received by the receiving virtual switch from RS may be performed. The real IP and the real port of the real server in the source address in a successfully matched data packet are translated to the virtual IP and the virtual port of the virtual server.

Step 307, sending the data packet returned by the real server directly to a client without the load balance gate wall.

In the present embodiment, although BGW has the function of translating the MAC address, the MAC field in the source address has no practical use, so it may not be translated by BGW. The original rmac is directly kept and sent to the client.

Figure 4:
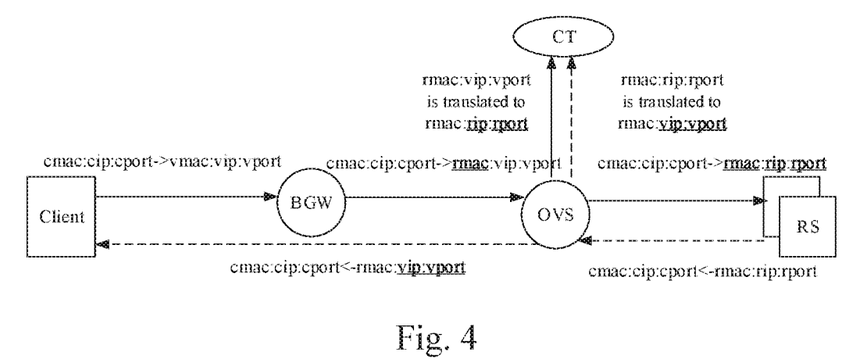
FIG. 4 is a schematic diagram of an application scenario of the method for transmitting data according to an embodiment of the present disclosure.

With further reference to FIG. 4, FIG. 4 is a schematic diagram of an application scenario of the method for transmitting data according to an embodiment of the present embodiment. In the application scenario of FIG. 4, by using the NAT function of OVS, instead of the TTM function, before a data packet sent by a client enters OVS, BGW makes a small part of changes to the corresponding data packet and modifies the original using vmac to using rmac. In OVS, a flow table uses vip: vport and the MAC address of the virtual machine network card of the real server to uniquely determine a data packet flowing into the virtual machine of the real server, and then performs NAT to this flow to translate vip: vport to rip: rport to enter the virtual machine. Then, when the virtual machine returns, the source IP is translated to VIP and the VIP is sent directly. CT (connection track) is used to record the address translation relationship of OVS, and calculate a source address translation relationship of the returned packet in advance.

In terms of data flow, compared with the existing solution, the data packet does not need to carry option information, but directly uses the option information as the destination address and the destination port. The translation relationship is configured by a control plane in advance, abandoning the method of directly carrying in the option, which may greatly improve the forwarding performance of the data plane. At the same time, this solution implemented through the flow table may provide the possibility of removing the bridge and realizing offload.

Figure 5:
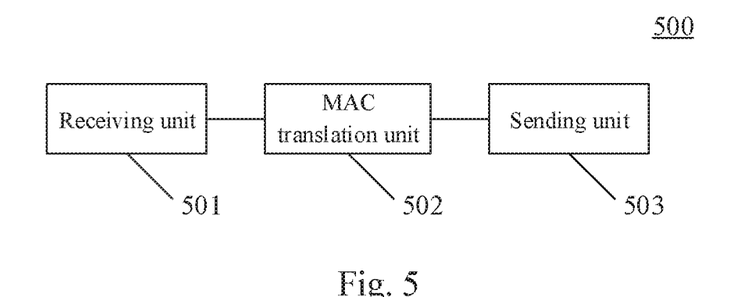
FIG. 5 is a schematic structural diagram of an apparatus for transmitting data according to an embodiment of the present disclosure.

With further reference to FIG. 5, as an implementation of the method shown in the above figures, an embodiment of the present disclosure provides an apparatus for transmitting data applied to a load balance gate wall, the apparatus embodiment corresponds to the method embodiment as shown in FIG. 2, and the apparatus may be specifically applied to various electronic devices.

As shown in FIG. 5, an apparatus 500 for transmitting data of the present embodiment includes: a receiving unit 501, a MAC translation unit 502 and a sending unit 503. The receiving unit 501 is configured to receive a data packet from a client, where a destination address of the data packet is a virtual MAC address of a virtual server: a virtual IP address: a virtual port. The MAC translation unit 502 is configured to translate the virtual MAC address to a real MAC address of the real server according to an address mapping relationship between a pre-configured real server and the virtual server. The sending unit 503 is configured to send a modified data packet to a computing node where the real server is located, and then hand the modified data packet over to a virtual switch for processing.

In the present embodiment, for specific processing of the receiving unit 501, the MAC translation unit 502 and the sending unit 503 in the apparatus 500 for transmitting data, reference may be made to step 201, step 202, and step 203 in the embodiment corresponding to FIG. 2.

In some alternative implementations of the present embodiment, the apparatus 500 further includes a mapping unit (not shown in the figure), configured to: configure, in response to an address configuration request sent by a meta-server, the address mapping relationship between the real server and the virtual server.

Figure 6:
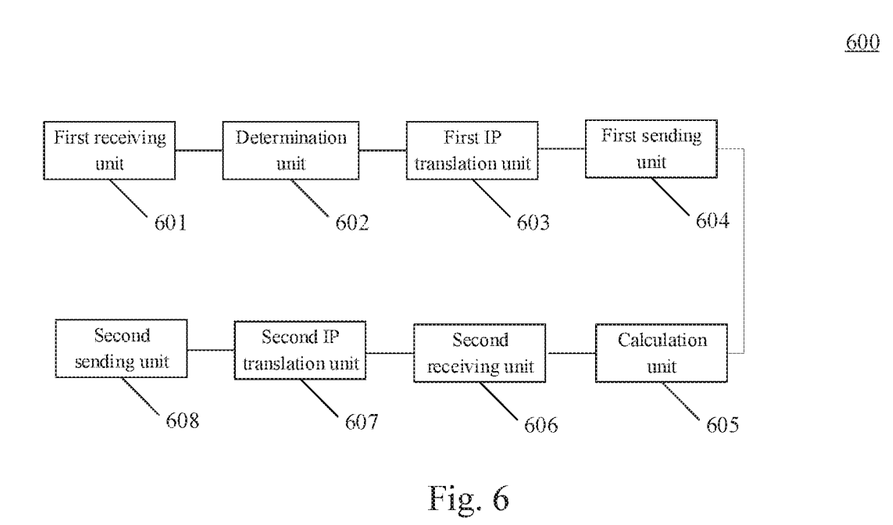
FIG. 6 is a schematic structural diagram of the apparatus for transmitting data according to another embodiment of the present disclosure.

With further reference to FIG. 6, as an implementation of the method shown in the above figures, an embodiment of the present disclosure provides an apparatus for transmitting data applied to a virtual switch, and the apparatus embodiment corresponds to the method embodiment as shown in FIG. 3, and the apparatus may be specifically applied to various electronic devices.

As shown in FIG. 6, an apparatus 600 for transmitting data of the present embodiment includes: a first receiving unit 601, a determination unit 602, a first IP translation unit 603 and a first sending unit 604. The first receiving unit 601 is configured to receive a data packet from a load balance gate wall. The determination unit 602 is configured to determine a data packet flowing into a real server according to a flow table. The first IP translation unit 603 is configured to translate a virtual IP and a virtual port of a virtual server in a destination address in the determined data packet to a real IP and a real port of the real server. The first sending unit 604 is configured to send a modified data packet to the real server.

In the present embodiment, for specific processing of the first receiving unit 601, the determination unit 602, the first IP translation unit 603 and the first sending unit 604 in the apparatus 600 for transmitting data, reference may be made to step 301, step 302, and step 303 in the embodiment corresponding to FIG. 3.

In some alternative implementations of the present embodiment, the apparatus 600 further includes a calculation unit 605, configured to: after translate a virtual IP and a virtual port of a virtual server in a destination address in the determined data packet to a real IP and a real port of the real server, calculate an address translation relationship of the data packet returned by the real server.

In some alternative implementations of the present embodiment, the apparatus 600 further includes: a second receiving unit 606, configured to receive the data packet returned by the real server; a second IP translation unit 607, configured to translate the real IP and the real port of the real server in a source address in the returned data packet to the virtual IP and the virtual port of the virtual server according to the address translation relationship; and a second sending unit 608, configured to send the data packet returned by the real server directly to a client without the load balance gate wall.

Figure 7:
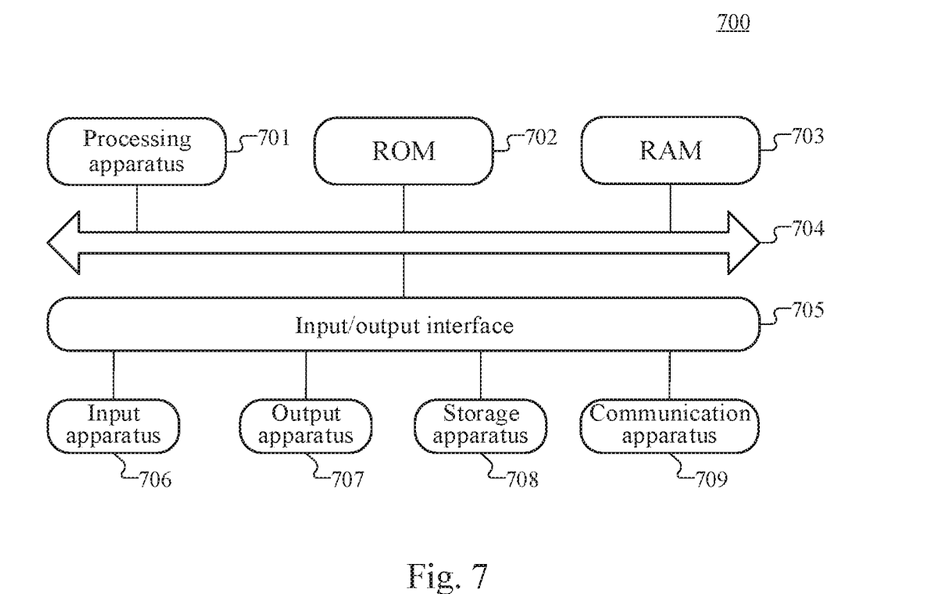
FIG. 7 is a schematic structural diagram of a computer system adapted to implement an electronic device according to an embodiment of the present disclosure.

Referring to FIG. 7, a schematic structural diagram of an electronic device 700 (such as the server, the load balance gate wall, the virtual switch, and the client as shown in FIG. 1) adapted to implement embodiments of the present disclosure is shown. The Client in the embodiments of the present disclosure may include, but are not limited to, a mobile phone, a notebook computers, a digital broadcast receivers, a PDA (Personal Digital Assistant), a PAD (tablet computers), a PMP (Portable Multimedia Player), a vehicle-mounted terminal (such as mobile terminal), a fixed terminal (such as a digital TV, a desktop computer), or the like. The client/server shown in FIG. 7 is merely an example, and should not limit the function and scope of use of the embodiments of the present disclosure.

As shown in FIG. 7, the electronic device 700 may include a processing apparatus (e.g., a central processing unit and a graphics processing unit) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following apparatuses may be connected to the I/O interface 705: an input apparatus 706, including such as a touch screen, a touch pad, a keyboard, a mouse, a camera, a microphone, an accelerometer, or a gyroscope; an output apparatus 707 including such as a liquid crystal display (LCD), a speaker, or a vibrator; the storage apparatus 708 including such as a magnetic tape, or a hard disk; and a communication apparatus 709. The communication apparatus 709 may allow the electronic device 700 to perform wireless or wired communication with other devices to exchange data. Although FIG. 7 shows the electronic device 700 having various apparatuses, it should be understood that it is not required to implement or have all the apparatuses shown. More or fewer apparatuses may be implemented or provided instead. Each block shown in FIG. 7 may represent one apparatus, and may also represent a plurality of apparatuses as required.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication apparatus 709, or may be installed from the storage apparatus 708, or may be installed from the ROM 702. The computer program, when executed by the processing apparatus 701, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the electronic device, or a stand-alone computer readable medium not assembled into the electronic device. The computer readable medium carries one or more programs. The one or more programs, when executed by the electronic device, cause the electronic device to: receive a data packet from a client, a destination address of the data packet being a virtual MAC address of a virtual server: a virtual IP address: a virtual port; translate the virtual MAC address to a real MAC address of the real server according to an address mapping relationship between a pre-configured real server and the virtual server; and send a modified data packet to a computing node where the real server is located, and then hand the modified data packet over to a virtual switch for processing. Or, cause the electronic device to: receive a data packet from a load balance gate wall; determine a data packet flowing into a real server according to a flow table; translate a virtual IP and a virtual port of a virtual server in a destination address in the determined data packet to a real IP and a real port of a real server; and send a modified data packet to the real server.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a receiving unit, a MAC translation unit and a sending unit. Here, the names of these units do not in some cases constitute limitations to such units themselves. For example, the receiving unit may also be described as "a unit configured to receive a data packet from a client".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for transmitting data, applied to a load balance gate wall, the method comprising:
   receiving, by the load balance gate wall, a data packet from a client, wherein a destination address of the data packet comprises a virtual MAC address of a virtual server a virtual IP address, and a virtual port;
   translating, by the load balance gate wall, the virtual MAC address to a real MAC address of a real server according to an address mapping relationship between a pre-configured real server and the virtual server; and
   sending, by the load balance gate wall, a modified data packet to a computing node where the real server is located, and then handing the modified data packet over to a virtual switch for processing, wherein the virtual switch translates the virtual IP and the virtual port in the destination address in the modified data packet to a real IP and a real port of the Dre-configured real server.

2. The method according to claim 1, wherein the method further comprises: configuring, in response to an address configuration request sent by a meta-server, the address mapping relationship between the pre-configured real server and the virtual server.

3. A method for transmitting data, applied to a virtual switch, the method comprising:
   receiving, by the virtual switch, a data packet from a load balance gate wall;
   determining, by the virtual switch, a data packet flowing into a real server according to a flow table;
   translating, by the virtual switch, a virtual IP and a virtual port of a virtual server in a destination address in the determined data packet to a real IP and a real port of the real server; and
   sending, by the virtual switch, a modified data packet to the real server.

4. The method according to claim 3, wherein, after translating the virtual IP and the virtual port of the virtual server in the destination address in the determined data packet to the real IP and the real port of the real server, the method further comprises:
   calculating an address translation relationship of a returned data packet returned by the real server.

5. The method according to claim 4, wherein the method further comprises:
   receiving the returned data packet returned by the real server;
   translating the real IP and the real port of the real server in a source address in the returned data packet to the virtual IP and the virtual port of the virtual server according to the address translation relationship; and
   sending the returned data packet returned by the real server directly to a client without the load balance gate wall.

6. The method according to claim 3, wherein the method further comprises:
   configuring, in response to an address configuration request sent by a meta-server, an address mapping relationship between the real server and the virtual server.

7. An apparatus for transmitting data, applied to a load balance gate wall, the apparatus comprising:
   at least one processor; and
   a memory storing instructions, wherein the instructions when executed by the at least one processor, cause the at least one processor to perform operations, the operations comprising:
   receiving a data packet from a client, wherein a destination address of the data packet comprises a virtual MAC address of a virtual server a virtual IP address, and a virtual port;
   translating the virtual MAC address to a real MAC address of a real server according to an address mapping relationship between a pre-configured real server and the virtual server; and
   sending a modified data packet to a computing node where the real server is located, and then hand the modified data packet over to a virtual switch for processing, wherein the virtual switch translates the virtual IP and the virtual port in the destination address in the modified data packet to a real IP and a real port of the pre-configured real server.

8. The apparatus according to claim 7, wherein the operations further comprise: configuring, in response to an address configuration request sent by a meta-server, the address mapping relationship between the pre-configured real server and the virtual server.

9. An apparatus for transmitting data, applied to a virtual switch, the apparatus comprising:
   at least one processor; and
   a memory storing instructions, wherein the instructions when executed by the at least one processor, cause the at least one processor to perform operations, the operations comprising:
   receiving a data packet from a load balance gate wall;
   determining a data packet flowing into a real server according to a flow table;

translating a virtual IP and a virtual port of a virtual server in a destination address in the determined data packet to a real IP and a real port of the real server; and sending a modified data packet to the real server.

10. The apparatus according to claim 9, wherein after translating the virtual IP and the virtual port of the virtual server in the destination address in the determined data packet to the real IP and the real port of the real server, the method further comprises:

calculating an address translation relationship of the data packet returned by the real server.

11. The apparatus according to claim 10, wherein the operations further comprise:

receiving the returned data packet returned by the real server;

translating the real IP and the real port of the real server in a source address in the returned data packet to the virtual IP and the virtual port of the virtual server according to the address translation relationship; and sending the returned data packet returned by the real server directly to a client without the load balance gate wall.

* * * * *